United States Patent
Birru et al.

(10) Patent No.: US 8,588,339 B2
(45) Date of Patent: Nov. 19, 2013

(54) SYSTEM AND METHOD FOR DETECTING TEMPORARILY UNUSED BANDWIDTH IN THE RF SPECTRUM

(75) Inventors: Dagnachew Birru, Yorktown Heights, NY (US); Gennady Turkenich, Hillsdale, NJ (US)

(73) Assignee: Koninklijke Philips N.V., Eindhoven (NL)

( * ) Notice: Subject to any disclaimer, the term of this patent is extended or adjusted under 35 U.S.C. 154(b) by 929 days.

(21) Appl. No.: 12/301,315

(22) PCT Filed: May 17, 2007

(86) PCT No.: PCT/IB2007/051894
§ 371 (c)(1),
(2), (4) Date: Nov. 18, 2008

(87) PCT Pub. No.: WO2007/135639
PCT Pub. Date: Nov. 29, 2007

(65) Prior Publication Data
US 2009/0268830 A1    Oct. 29, 2009

Related U.S. Application Data

(60) Provisional application No. 60/801,448, filed on May 18, 2006.

(51) Int. Cl.
*H04L 27/00* (2006.01)

(52) U.S. Cl.
USPC ........................................... 375/316; 375/260

(58) Field of Classification Search
USPC .................. 375/260, 285, 147–153, 316–352
See application file for complete search history.

(56) References Cited

U.S. PATENT DOCUMENTS

| | | | |
|---|---|---|---|
| 5,886,748 A * | 3/1999 | Lee | .................................. 348/21 |
| 6,374,102 B1 | 4/2002 | Brachman | |
| 6,385,434 B1 | 5/2002 | Chuprun | |
| D474,047 S | 5/2003 | Lara | |
| 7,528,751 B2 * | 5/2009 | Park et al. | ..................... 341/110 |

(Continued)

OTHER PUBLICATIONS

M. Bellec et al., "A PHY/MAC Proposal ofr IEEE 802.22 WRAN Systems—Part 1: The PHY—doc: IEEE 802.22-06/0004r0", Internet Citation, Jan. 11, 2006, XP007902868, pp. 26, line 3, pp. 33, line 2 URL:http://www.ieee802.org/22/Meeting_documents/2006_Jan/index.html.

(Continued)

*Primary Examiner* — Sam K Ahn
*Assistant Examiner* — Janice Tieu
(74) *Attorney, Agent, or Firm* — Larry Liberchuk

(57) ABSTRACT

A method (200) and system (300) for detecting temporarily available bandwidth in a frequency band: select (205) a channel in the frequency band; measure (210) an energy received in the selected channel; compare (215) the measured energy to a first threshold; when the measured energy exceeds the first threshold, determine that the channel is unavailable (220) for transmission, otherwise determine (225) that the channel is available for transmission; correlate (255) a signal received in the channel with a known feature of a signal conforming to a particular transmission format; compare (260) the correlation result to a second threshold; when the correlation result in the channel exceeds the second threshold, determine (265) that a signal conforming to the particular transmission format is present in the channel, otherwise determine (270) that the signal conforming to the particular transmission format is not present in the channel.

20 Claims, 4 Drawing Sheets

(56) References Cited

U.S. PATENT DOCUMENTS

| | | |
|---|---|---|
| 7,853,978 B2 * | 12/2010 | Endres et al. .................. 725/85 |
| 2004/0022332 A1 * | 2/2004 | Gupta et al. .................. 375/343 |
| 2004/0117139 A1 | 6/2004 | Gounalis |
| 2005/0058153 A1 | 3/2005 | Santhoff |
| 2005/0197118 A1 | 9/2005 | Mitchell |
| 2006/0195883 A1 * | 8/2006 | Proctor et al. ................ 725/127 |
| 2007/0100922 A1 * | 5/2007 | Ashish .......................... 708/400 |
| 2007/0202867 A1 * | 8/2007 | Waltho et al. ................ 455/423 |

OTHER PUBLICATIONS

D. Cabric et al., "Implementation Issues in Spectrum Sensing for Cognitive Radios", Signals, System and Computers, 2004, Conference Record of the Thirty-Eighth ASILOMAR Conf. on Pacific Grove, CA, Piscataway, NJ Nov. 7, 2004, pp. 772-776, XP0107881056.

A. Fehske et al., "A New Approach to Signal Classification Using Spectral Correlation and Neural Networks", New Frontiers in Dynamic Spectrum Access Networks, 2005, DYSPAN 2005, First IEEE Int'l Symposium on Baltimore, MD, Piscataway, NJ, IEEE, Nov 8, 2005, pp. 144-150, XP010855-93.

* cited by examiner

SYSTEM AND METHOD FOR DETECTING TEMPORARILY UNUSED BANDWIDTH IN THE RF SPECTRUM

CROSS-REFERENCE TO RELATED APPLICATIONS

This invention pertains to a method and system of detecting the presence (or absence) of a signal, and more particularly to a method and system of detecting temporarily unused bandwidth in the RF spectrum.

With the proliferation of unlicensed wireless devices, detection of whether a certain portion of the frequency spectrum is occupied by other licensed or unlicensed devices is becoming a key ingredient of future unlicensed wireless devices. For example, the FCC has proposed to allow unlicensed radio transmitters to operate within the broadcast television spectrum at locations where one or more of the allocated terrestrial television channels are not being used. However, the FCC stressed that such unlicensed transmitters would only be permitted with safeguards that insure no interference with the reception of licensed terrestrial television signals.

Accordingly, in order to ensure that no interference is caused to existing licensed services, unlicensed transmitters must incorporate the capability to identify unused or vacant spectrum and to only transmit on such vacant spectrum. One idea advanced by the FCC would be to incorporate sensing capabilities in the unlicensed transmitter to detect whether other transmitters (e.g., licensed terrestrial TV broadcast transmitters) are operating on a particular channel in the area before the unlicensed transmitter could be activated.

For example, an unlicensed transmitter could be required to incorporate an antenna and a receiver capable of detecting whether a particular portion of spectrum is actually in use in the area where the transmitter is to be installed. In that case, to prevent interference with existing service(s), before an ultra-wideband (UWB) transmitting device begins operation on a particular portion of spectrum it first must check to see if other higher priority users (e.g., licensed terrestrial TV broadcast transmitters) are operating on the particular portion of spectrum in the area before the UWB transmitter could be activated. At the same time, in some cases the UWB system must also determine whether another UWB system, or some other authorized narrowband system, is already operating in the portion of spectrum.

If the antenna and receiver detect an existing signal is being locally transmitted on a particular portion of spectrum, then the unlicensed transmitter is prevented from using that portion of spectrum. The unlicensed transmitter is only permitted to operate on a particular portion of spectrum in a particular location if the antenna and receiver verify that no existing transmission (e.g., a terrestrial television broadcast signal) is present in that portion of spectrum.

Accordingly, it would be desirable to provide a method and system of detecting temporarily unused bandwidth in the RF spectrum. It would also be desirable to provide a method and system of detecting whether a signal occupying a particular portion of spectrum employs a particular transmission format. The present invention is directed to addressing one or more of the preceding concerns.

In one aspect of the invention, a method of detecting temporarily available channels in a frequency band comprises: (a) selecting a channel among a plurality of channels in a frequency band; (b) measuring an energy received in the selected channel; (c) comparing the measured energy received in the selected channel to a threshold established for the selected channel; (d) when the measured energy received in the selected channel exceeds the threshold established for the selected channel, determining the selected channel is unavailable for transmission, otherwise determining that the selected channel is available for transmission; (e) repeating steps (a) through (d) for each of a plurality of channels in the frequency band; (f) selecting one of the channels that was determined in step (d) to be unavailable; (g) correlating a signal received in the selected unavailable channel with a known feature of a signal conforming to a particular transmission format; (h) comparing the correlation result to a second threshold; (i) when the correlation result in the selected unavailable channel exceeds the second threshold, determining that a signal conforming to the particular transmission format is present in the selected unavailable channel, otherwise determining that the signal conforming to the particular transmission format is not present in the selected unavailable channel; and (j) repeating steps (f) through (i) for each channel that was determined in step (d) to be unavailable.

In another aspect of the invention, a system for detecting temporarily available bandwidth in a frequency band comprises: a receiver front-end adapted to select a portion of spectrum in the frequency band; an energy detector adapted to measure energy present in the selected portion of spectrum; a first comparator adapted to compare the measured energy in the selected portion of spectrum to a threshold established for the selected portion of spectrum; a correlator adapted to correlate a signal received in the selected portion of spectrum with a known feature of a signal conforming to a particular transmission format; and a second comparator adapted to compare the correlation result to a second threshold.

In yet another aspect of the invention, a method of detecting temporarily available bandwidth in a frequency band comprises: (a) selecting a portion of spectrum in the frequency band; (b) measuring an energy received in the selected portion of spectrum; (c) comparing the measured energy received in the selected portion of spectrum to a threshold established for the selected portion of spectrum; (d) when the measured energy received in the selected portion of spectrum exceeds the threshold established for the selected portion of spectrum, determining the selected portion of spectrum is unavailable for transmission, otherwise determining that the selected portion of spectrum is available for transmission; (e) correlating a signal received in the selected portion of spectrum with a known feature of a signal conforming to a particular transmission format; (f) comparing the correlation result to a second threshold; (g) when the correlation result in the selected portion of spectrum exceeds the second threshold, determining that a signal conforming to the particular transmission format is present in the selected portion of spectrum, otherwise determining that the signal conforming to the particular transmission format is not present in the selected portion of spectrum; and (h) repeating steps (a) through (g) for each of a plurality of portions of spectrum spanning the frequency band.

Further and other aspects will become evident from the description to follow.

Figure 3:
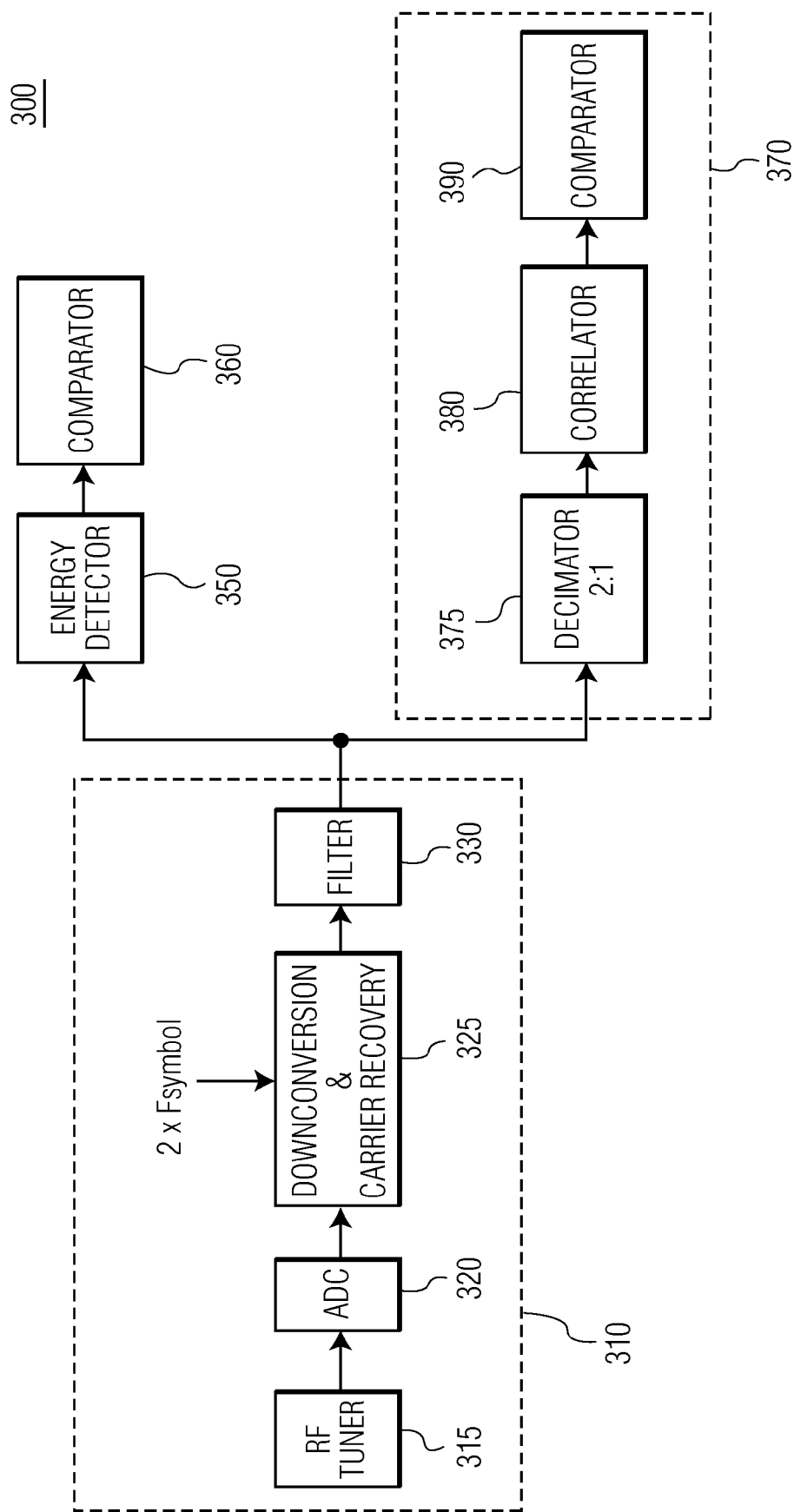
FIG. 3 illustrates a detailed block diagram of one embodiment of a system for detecting temporarily unused bandwidth in a frequency band.
Figure 4A:
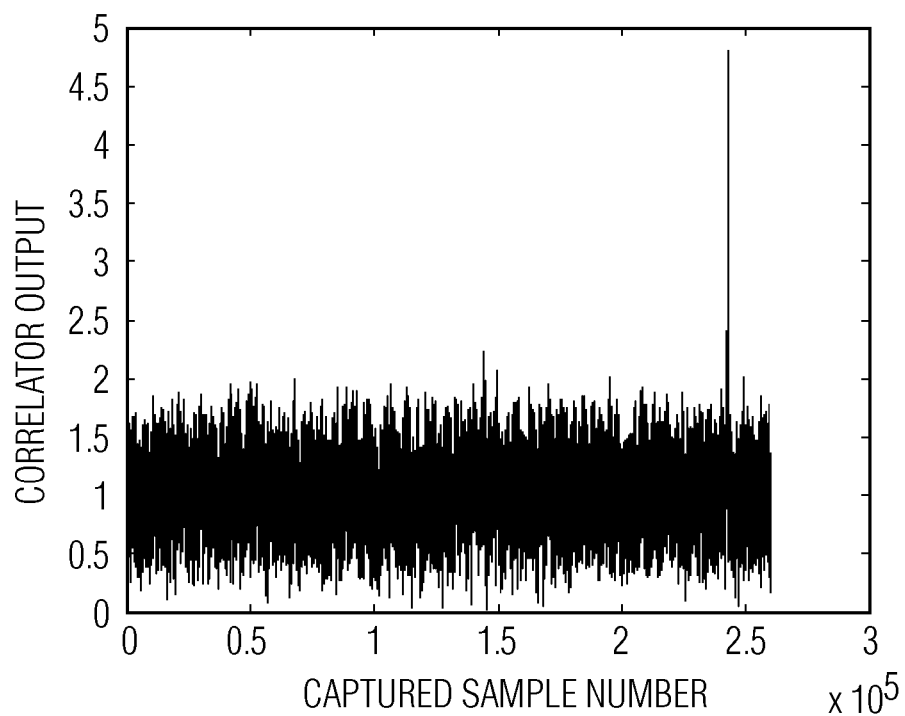
Figure 4B:
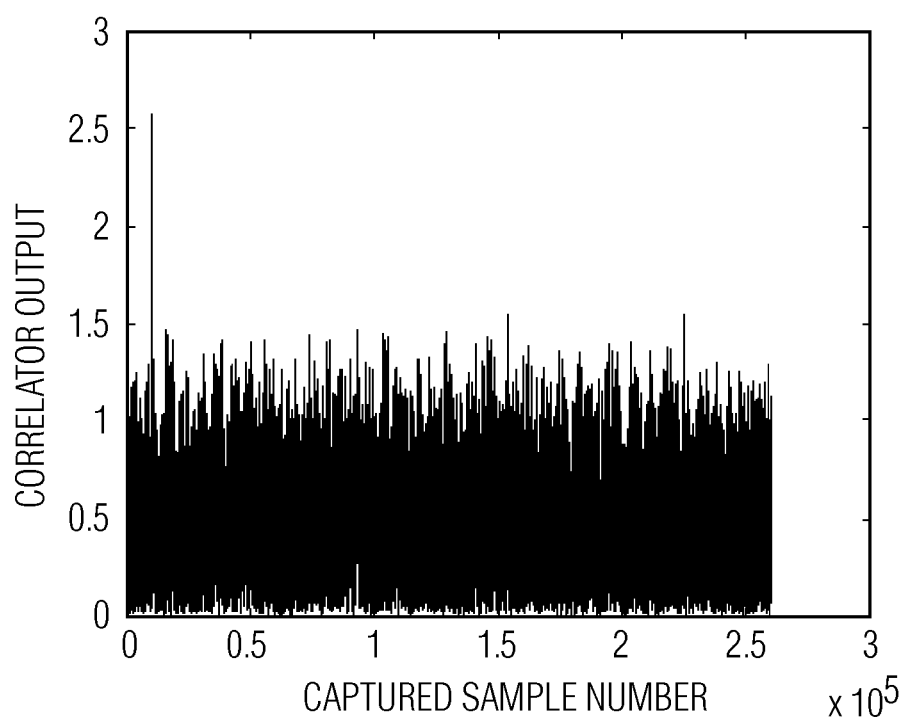

FIGS. 4A-B illustrate outputs of the correlator of FIG. 3 at different input signal-to-noise ratios (SNRs).

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

Figure 1:
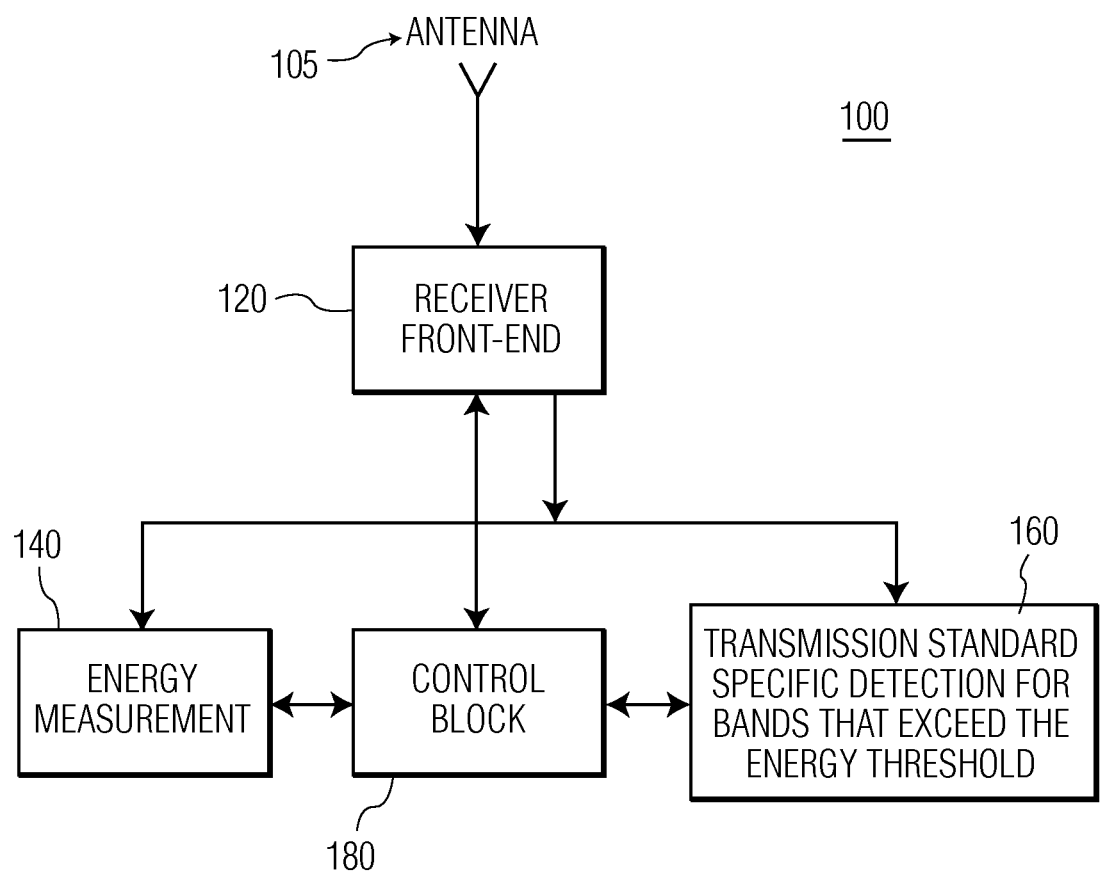
FIG. 1 is a high level block diagram of one embodiment of a system for detecting temporarily unused bandwidth in a frequency band.

FIG. 1 is a high level block diagram of one embodiment of a system 100 for detecting temporarily unused bandwidth in a frequency band. As will be appreciated by those skilled in the art, the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined in various ways in any physical implementation.

System 100 includes an antenna 105, a receiver front-end section 120, an energy measurement block 140, a transmission format specific detection block 160, and a controller 180. Controller 180 may include a processor and memory configured to execute one or more algorithms in software and/or firmware.

Operationally, receiver front-end section 120 receives one or more frequency bands, which may be continuous or discontinuous (e.g., VHF low, VHF-high, and UHF bands). Receiver front-end section 120 tunes to (selects) a portion of the spectrum in response to one or more control signals from controller 180. Beneficially, the selected portion of spectrum may correspond to one channel of a particular protected communication service, e.g., one TV channel. However, alternatively, the selected portion of the spectrum may span several channels, or even just a portion of a single channel. The output of receiver front-end section 120 is provided to energy measurement block 140 and transmission format specific detection block 160. Energy measurement block 140 measures the energy present in the selected portion of the spectrum to try to determine if a signal is present, or if there is only noise. Transmission format specific detection block 160 tries to determine if a known feature of a signal conforming to a particular transmission format (e.g. NTSC standard; ATSC standard, etc.) is found in the selected spectrum portion. Transmission format specific detection block 160 may include sub-blocks for several different transmission formats.

Figure 2:
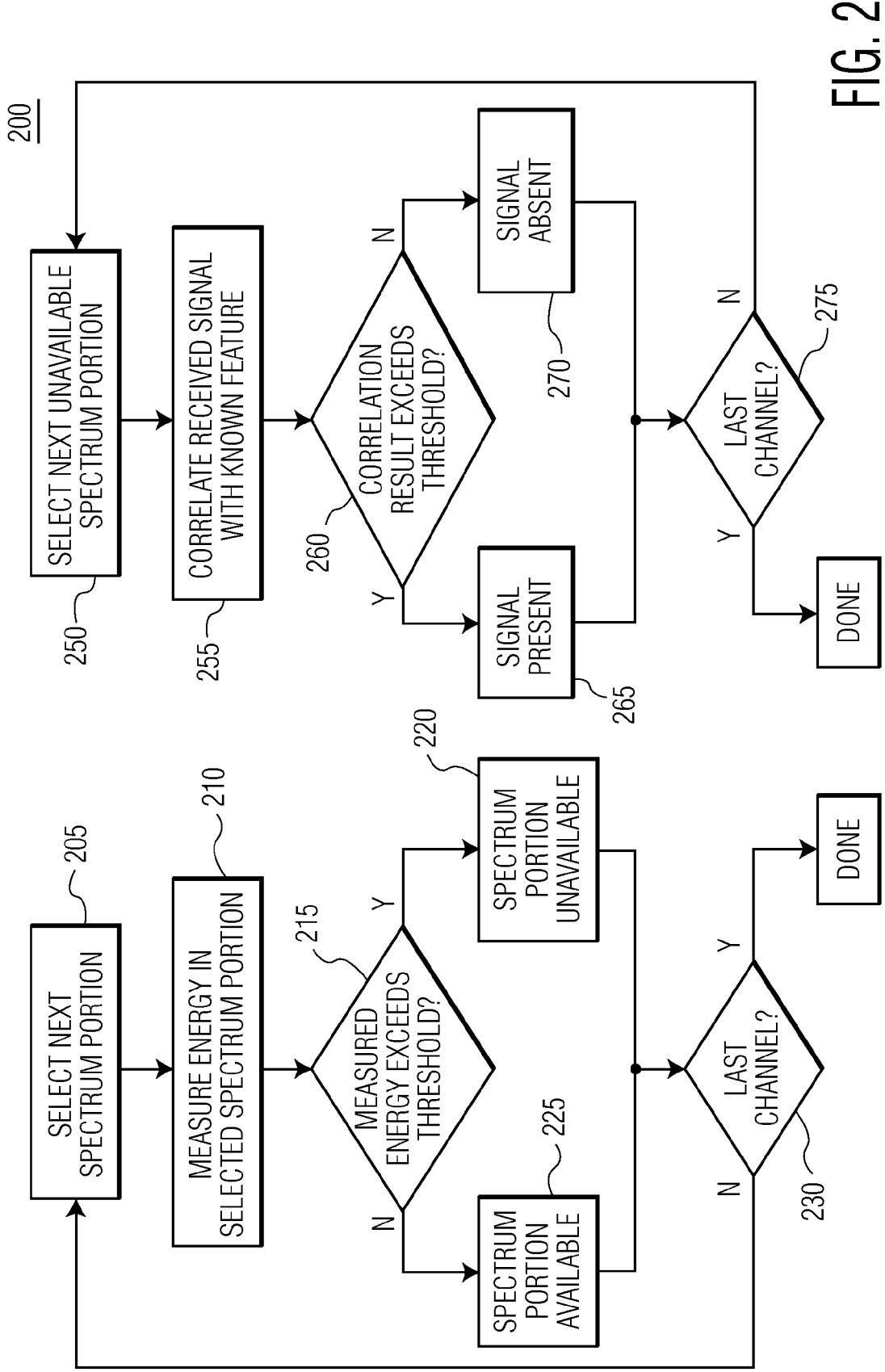
FIG. 2 illustrates one embodiment of a process of detecting temporarily unused bandwidth in a frequency band.

FIG. 2 illustrates one embodiment of a process 200 of detecting temporarily unused bandwidth in a frequency band. For simplification of illustration and explanation, FIG. 2 divides the process 200 into two parts, labeled "PART 1" and "PART 2." As explained in greater detail below, it should be understood that PART 1 and PART 2 could be performed simultaneously, or sequentially. When performed sequentially, PART 2 could be performed on each portion of spectrum separately immediately after the portion of spectrum is determined to be unavailable in PART 1, or PART 2 could be performed on all of the unavailable portions of spectrum after the all of the frequency band has been tested in PART 1.

Turning to FIG. 2, in a first step 205 of PART 1, a next portion of spectrum in the frequency band is selected (e.g., tuned-in by a tuner). Beneficially, the selected portion of spectrum corresponds to one communication channel for a protected service (e.g., a TV channel). However, alternatively, the selected portion of the spectrum may span several channels, or even just a portion of a single channel.

Then, in a step 210, energy received in the selected portion of spectrum is measured. Beneficially, the energy is averaged over a predetermined interval.

Next, in a step 215, the measured energy received in the selected portion of spectrum is compared to a first threshold. Beneficially, as explained below, the first threshold may be a constant, c, multiplied by an expected input noise energy in the selected portion of spectrum in the absence of an input signal. Nominally, the expected input noise energy in the selected portion of spectrum equals the noise power of the receiver front-end that can be pre-computed for a given front-end receiver design. Alternatively, it can also be estimated by implementing the energy averaging function in the absence of input signal. This can be done on a periodic basis by tuning the receiver front-end to a frequency channel that is known not to have a signal. In one embodiment, c is set to a number about 1.2. Beneficially, the first threshold can be varied from one portion of spectrum to another portion of spectrum in a same frequency band. That is, an individual threshold can be established for each selected portion of spectrum.

When the measured energy received in the selected portion of spectrum exceeds the first threshold, then in a step 220 it is determined that the selected portion of spectrum is unavailable for transmission. Otherwise, in a step 225, it is determined that the selected portion of spectrum is available for transmission. Beneficially, data representing the selected portion of spectrum and the result of the comparison are stored in memory.

In a step 230 it is determined whether the selected portion of spectrum is the last portion of spectrum to be checked in the frequency band. If not, then the process returns to step 205 where a next portion of spectrum in the frequency band is selected, and the process continues. On the other hand, if it is determined in step 230 that the selected portion of spectrum is the last portion of spectrum to be checked in the frequency band, then PART 1 ends.

In a first step 250 of PART 2, a next portion of spectrum determined in PART 1 to be unavailable is selected (e.g., tuned-in by a tuner).

Then, in a step 255, a signal received in the selected unavailable portion of spectrum is correlated with a known feature of a signal conforming to a particular transmission format.

Next, in a step 260, the correlation result is compared to a second threshold.

When the correlation result exceeds the second threshold, then in a step 265 it is determined that a signal conforming to the particular transmission format is present in the selected unavailable portion of spectrum. In that case, data representing the selected portion of spectrum and the particular transmission format is stored in memory. Otherwise, in a step 270, it is determined that a signal conforming to the particular transmission format is not present in the selected unavailable portion of spectrum.

In a step 275 it is determined whether the selected unavailable portion of spectrum is the last unavailable portion of spectrum to be tested. If not, then the process returns to step 250 where a next unavailable portion of spectrum is selected, and the process continues. On the other hand, if it is determined in step 275 that the selected unavailable portion of spectrum is the last unavailable portion of spectrum in the frequency band, then PART 2 ends.

Beneficially at the end of the process 200 the following information is available: (1) a list of currently unused portions of spectrum (if any) that are available for the transmission; and (2) several lists of currently occupied portions of spectrum, separated by their respective employed transmission formats. Information in item 1 above could be used immediately by an ultra-wideband transmitter or other agile radio (AR) to choose a portion of spectrum for transmission.

The portions of spectrum listed in the item (2) above could be broadly separated into two groups: (1) those portions used by licensed operators with a "permanent" band assignment; and (2) those, similar to ARs, that use the channels opportunistically. The portions of spectrum of the first group, under the current FCC regulations, are considered as the taboo portions of spectrum from the AR's point of view. The second group of spectrum portions that are used by unlicensed operators, among others, might become available under some circumstances.

It should be understood that the in other embodiments, the order of steps performed in FIG. 2 may be modified. For example, steps 255 through 270 may be performed immediately following step 220 for each unavailable portion of spectrum, and after step 270, then the process would return to step 230. In that case, steps 275 and 280 may be eliminated. In yet another embodiment, steps 210-225 may be performed in parallel with steps 255-270. In that case, step 275 may be eliminated.

In practice, PART 1 of the process 200 detects whether there is sufficient signal energy in a portion of spectrum to come to the conclusion that is occupied with another transmission. In one embodiment, this may be done through averaging of the square of the input signal. The input signal, after filtering is usually composed of two components: the quadrature and in-phase components. Each component approximately exhibits a Guassian distribution. The probability density function for the squared magnitude of a complex Gaussian signal, $y=|x_1+jx_Q|^2$, follows the following exponential function:

$$f(y) = \frac{e^{-y/2\sigma^2}}{2\sigma^2}.$$

The mean of this density function is $2\sigma^2$ and the variance equals the square of the mean. The cumulative distribution function (CDF) for this density function is simply:

$$CDF = 1 - e^{-y/2\sigma^2}$$

This signal, y(k), can be averaged over a window of time comprising K samples, as:

$$p(k) = \frac{1}{K}\sum_{i=0}^{K-1} y(k+i)$$

The probability density function for this signal follows the well-known Erlang density function:

$$f(p) = \frac{\lambda(\lambda p)^{K-1}}{(K-1)!} e^{-\lambda p}$$

where $\lambda = K/(2\sigma^2)$. The cumulative distribution function (CDF) is also given by $$CDF = \Gamma(K, p\lambda)$$

where $\Gamma(\ )$ is the incomplete Gamma function. The mean and variance of f(p) are:

$$mean = K/\lambda = 2\sigma^2$$

and $$variance = K/\lambda^2 = (2\sigma^2)^2 K = mean^2/K.$$

Thus, more averaging makes the variance approach zero. If K is large, this density can be approximated with a Gaussian density function, however, as indicated above, the variance approaches zero.

The mean and variance of p(k) can be estimated using a first-order low-pass filter as:

$$\mu(k) = \delta\mu(k-1) + (1-\delta)p(k)$$

$$\eta(k) = \alpha\eta(k-1) + (1-\beta)(\mu(k)-p(k))^2$$

where $\delta$ and $\beta$ are constant factors (forgetting factors), $\mu(k)$ and $\eta(k)$ are the estimated mean and variance respectively. As indicated above, for a random input:

$$\eta(k) = \mu^2(k)/K$$

This is fundamental information that can be used to detect a signal that has known features. When there is an input signal, then the above estimated power will equal the sum of the power of the background noise and that of the signal. In that case, $\sigma^2 = \sigma_1^2 + \sigma_2^2$, where $\sigma_1^2$ is the power of the noise and $\sigma_2^2$ is the power of the signal being detected. In that case, a signal is considered to be present in a portion of spectrum when:

$$p(k) > c\mu,$$

where "c" is a constant, and $\mu = 2\sigma_1^2$. Then, out of M independent observations: the probability of missed detection; the probability of correct detection; and the probability of false alarm; can be described by:

$$Prob\_miss = \Gamma\left(K, Kc\frac{1}{(1+SNR)}\right)^M$$

$$Prob\_detection = 1 - \Gamma\left(K, Kc\frac{1}{(1+SNR)}\right)^M$$

$$Prob\_false\_alarm = 1 - \Gamma(K, Kc)^M$$

In one embodiment, the constant "c" may be 1.2, the probability of missed detection may be 1%, and the probability of false alarm may be 10%.

Alternatively, the detection algorithm can be generalized to one in which detection is declared when at least N out of M independent observations satisfy the detection criteria. In that case, the following probability functions apply:

$$Prob\_detection = \sum_{l=N}^{M} \binom{M}{l}\left(1-\Gamma\left(K, Kc\frac{1}{(1+SNR)}\right)\right)^l \Gamma\left(K, Kc\frac{1}{(1+SNR)}\right)^{M-l}$$

$$Prob\_false\_alarm = \sum_{l=N}^{M} \binom{M}{l}(1-\Gamma(K, Kc))^l \Gamma(K, Kc)^{M-l}$$

The functions above can be approximated using a Gaussian density function. It is noted that $\mu$ needs to be estimated in the absence of an input signal. Nominally, it equals the noise power of the front-end that can be pre-computed for a given front-end receiver design. On the other hand, it can also be estimated by implementing the averaging function in the absence of input signal. This can be done on a periodic basis by tuning the front-end receiver to a portion of spectrum that is known not to have a signal (e.g., a known vacant TV channel). This averaged value can then be compared to the expected theoretical noise power. The validity of this measurement can be ascertained depending on how close it is to the expected value. Once the noise power estimation is done, the front-end tunes its center-frequency to the frequency-band that it is trying to detect. The parameters that are used for averaging depend on the desired performance criteria. The probability functions described above can be used as a guide to estimate the averaging window, K, and the number of independent trails for detection, M.

Although measuring the energy a portion of spectrum and comparing it to a threshold can be used to detect the presence of a signal, it does not tell anything at all about the type of signal that is present. For example, the detected signal may be a signal from a licensed transmitter such as a DTV (US DTV, DVB-T, etc.) transmitter, or it may be a signal from some other unlicensed transmitter. In general, the energy measurement will not distinguish between these different signals.

It is therefore of interest to detect the type of the signal so that an agile radio can take the appropriate actions based on the signal (e.g., vacate the channel if a DTV signal is present). This requires detection a specific feature of a signal conforming to a particular transmission standard or format.

As an example, for a DTV signal in the United States, one might consider locking onto the pilot signal, locking onto the band-edge part of the signal (commonly also known as excess bandwidth and used for clock synchronization), or demodulating the complete signal and trying to lock to the TV signal. Since an agile radio typically needs to be able to detect a DTV signal at a signal level that is 15-30 dB below the threshold for normal reception of the signal, it would be difficult to entirely lock onto the signal at low SNR and heavy multipath conditions. Trying to lock into the pilot or the band-edges would also make the system more prone to frequency-selective multipath fading. It is thus of interest to devise a method that is robust to multipath.

Accordingly, in one embodiment, the received signal is correlated with a copy of a known reference signal. For a DTV signal in the United States, the known reference signal can be the PN511 sequence (or a portion thereof). For DVB-T (e.g., in Europe), the known reference signal can be the cyclic prefix of the OFDM signal. In the description to follow, detection of a DTV signal in the United States is provided as an example. However, similar principles can also be used for other transmission schemes, such as DVB-T.

Assuming that the signal is not Guassian, such as a sample of p(k) exhibiting a value very different from the normal range (for example, a peak), then the variance will respond faster than the mean, yielding:

$$\eta(k') > \mu^2(k')/K$$

where k' is the sample where the abnormal sample is shown in p(k). For a noisy environment, one can use the condition:

$$\eta(k') > c\mu^2(k')/K$$

where c is a constant, c>1. When this condition is true, then one can conveniently declare that an abnormal sample in p(k) has been detected:

FIG. 3 illustrates a detailed block diagram of one embodiment of a system 300 for detecting temporarily unused portions of spectrum in a frequency band. System 300 includes a receiver front-end section 310, an energy detector 350, a first comparator 360, and transmission format specific detection block 370. Although not shown in FIG. 3 to simplify the drawing, beneficially the system 300 includes a controller such as the controller 180 of FIG. 1 (including a processor and memory) controlling various aspects of receiver front-end section 310, energy detector 350, and/or transmission format specific detection block 370.

Receiver front-end section 310 includes an RF tuner 315, an analog-to-digital converter (ADC) 320, a downconverter 325, and a band-limiting filter 330. In one embodiment, band-limiting filter 330 may be a square root raised cosine.

Transmission format specific detection block 370 includes a 2:1 decimation block 375, a correlator 380, and a second comparator 390.

Operationally, RF tuner 315 tunes-in (selects) a portion of spectrum (e.g., a channel) in a frequency band.

Analog-to-digital converter (ADC) 320 digitizes an output of RF tuner 315 for the selected portion of spectrum.

Downconverter 325 downconverts the digitized tuner output to baseband, and band-limiting filter 330 filters the digitized baseband signal. The output of the receiver front-end 310 (i.e., the output of band-limiting filter 330) is provided to both energy detector 350 and transmission format specific detection block 370.

Energy detector 350 measures energy present in the selected portion of spectrum. Energy detector 350 may average the energy over a predetermined time period. First comparator 360 compares the measured energy in the selected portion of spectrum to a first threshold. Beneficially, as explained above, the first threshold may be a constant, c, multiplied by an expected input noise energy in the selected portion of spectrum in the absence of an input signal. Nominally, the expected input noise energy in the selected portion of spectrum equals the noise power of the receiver front-end that can be pre-computed for a given front-end receiver design. Alternatively, it can also be estimated by implementing the energy averaging function in the absence of input signal. This can be done on a periodic basis by tuning receiver front-end 310 to a frequency channel that is known not to have a signal. In one embodiment, c is set to a number about 1.2. Also, as explained above, beneficially the first threshold can be varied from one portion of spectrum to another portion of spectrum in a same frequency band. That is, an individual threshold can be established for each selected portion of spectrum.

When the measured energy received in the selected portion of spectrum exceeds the first threshold, it is determined that the selected portion of spectrum is unavailable for transmission. Otherwise, it is determined that the selected portion of spectrum is available for transmission. Beneficially, data representing the selected portion of spectrum and the result of the comparison is stored in memory, such as memory that may be included in controller 180.

Correlator 380 correlates a signal received in the selected portion of spectrum with a known feature of a signal conforming to a particular transmission format. Second comparator 390 compares the correlation result to a second threshold.

FIGS. 4A-B illustrate outputs of correlator 380 of FIG. 3 at two different input signal-to-noise ratios (SNRs). The output plots present absolute values of the cross correlation between the 8VSB symbols and the PN511 pseudo-random sequence vs. captured symbol numbers. The PN511 sequence is embedded in each field of the ATSC conforming broadcast signal. The outstanding correlation values of 4.8 and 2.5 in FIGS. 4A-B respectively indicate the position of the PN511 sequences in those two cases. The position of the PN511 sequence within captured fields is not constant since the data capture is asynchronous vs. ATSC field boundaries.

FIGS. 4A-B were taken under input SNR levels of 15 dB and −5 dB respectively. One field worth of data (~260,000 symbols), critically sampled at double the symbol rate, was used for each plot. The outstanding correlation values of 4.8 and 2.5 in FIGS. 4A-B respectively indicate the detected presence of an ATSC signal in the channel. It should be noted that the ATSC 8VSB receiver needs an input SNR of at least 15.3 dB to function properly. Therefore, FIG. 4B demonstrates that a possible implementation of transmission format specific detection block 370 in system 300 of FIG. 3 has an edge of almost 20 dB over any ATSC TV receiver, and is a reliable detector of that type of signal.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. A method of detecting temporarily available channels in a frequency band, comprising:
   (a) selecting a channel among a plurality of channels in a frequency band;
   (b) measuring an energy received in the selected channel;
   (c) comparing the measured energy received in the selected channel to a threshold established for the selected channel;
   (d) when the measured energy received in the selected channel exceeds the threshold established for the selected channel, determining the selected channel is unavailable for transmission, otherwise determining that the selected channel is available for transmission;
   (e) repeating (a) through (d) for each of a plurality of channels in the frequency band;
   (f) selecting one of the channels that was determined in (d) to be unavailable;
   (g) correlating a signal received in the selected unavailable channel with a known feature of a signal conforming to a particular transmission format;
   (h) comparing the correlation result to a second threshold;
   (i) when the correlation result in the selected unavailable channel exceeds the second threshold, determining that the signal received in the selected unavailable channel conforms to the particular transmission format, otherwise determining that no signal conforming to the particular transmission format is present in the selected unavailable channel; and
   (j) repeating (f) through (i) for each channel that was determined in (d) to be unavailable.

2. The method of claim 1, wherein the first threshold is a constant multiplied by an expected input noise energy in the selected channel in the absence of an input signal.

3. The method of claim 2, wherein the expected input noise energy in the selected channel in the absence of an input signal is determined by tuning to a channel where it is known that no signal is present.

4. The method of claim 2, wherein the constant is selected to achieve a desired probability of missed detection, a desired probability of false alarm, and desired probability of detection.

5. The method of claim 1, wherein measuring the energy received in the selected channel comprises averaging the received energy over a selected interval.

6. The method of claim 1, wherein measuring the energy received in the selected channel comprises:
   digitizing a signal received in the selected channel;
   downconverting the signal to baseband;
   passing the signal through a square root raised cosine filter; and
   squaring the signal output from the square root raised cosine filter.

7. The method of claim 1, wherein the particular transmission format is one of an 8-level vestigial sideband (8-VSB) transmission format and a Digital Video Broadcast-Terrestrial transmission format.

8. The method of claim 7, wherein the known feature of a signal conforming to the particular transmission format is one of a PN511 pseudo-random sequence and a cyclic prefix of an orthogonal frequency division multiplex signal.

9. The method of claim 1, wherein (e) is performed prior to (f) through (j).

10. The method of claim 1, wherein (e) is performed after (f) through (i).

11. The method of claim 1, further comprising repeating (f) through (j) for a second particular transmission format.

12. A system for detecting temporarily available bandwidth in a frequency band, comprising:
    a receiver front-end adapted to select a portion of spectrum in a frequency band;
    an energy detector adapted to measure energy present in the selected portion of spectrum;
    a first comparator adapted to compare the measured energy in the selected portion of spectrum to a threshold established for the selected portion of spectrum and to determine that the selected portion of spectrum is unavailable for transmission;
    a correlator adapted to correlate a signal received in the selected portion of spectrum unavailable for transmission with a known feature of a signal conforming to a particular transmission format;
    a second comparator adapted to compare the correlation result to a second threshold determine that the signal in the selected unavailable channel conforms to the particular transmission format when the correlation result in the selected unavailable channel exceeds the second threshold, otherwise determine that no signal conforming to the particular transmission format is present in the selected unavailable channel; and
    a controller configured to determine whether the selected portion of spectrum is a last portion of spectrum in the frequency band and, when the selected portion of spectrum is not the last portion of spectrum, direct the receiver front-end to select another portion of spectrum in the frequency band.

13. The system of claim 12, wherein the receiver front-end comprises:
    a radio frequency (RF) tuner adapted to tune-in the selected channel;
    an analog-to-digital converter adapted to digitize an output of the RF tuner for the selected channel;
    a downconverter adapted to downconvert the digitized tuner output to baseband; and
    a band-limiting filter adapted to filter the digitized baseband signal.

14. The system of claim 12, wherein the threshold established for the selected portion of spectrum is a constant multiplied by an expected input noise energy in the selected portion of spectrum in the absence of an input signal.

15. The system of claim 12, wherein the energy detector measures the energy received in the selected portion of spectrum by averaging the received energy over a selected number of samples.

16. The system of claim 12, wherein the correlator is adapted to correlate the signal received in the selected portion of spectrum with at least one of: a PN511 pseudo-random sequence of a signal conforming to an 8-level vestigial sideband (8-VSB) transmission format, and a cyclic prefix of an orthogonal frequency division multiplex signal.

17. A method of detecting temporarily available bandwidth in a frequency band, comprising:
  (a) selecting a portion of spectrum in a frequency band;
  (b) measuring an energy received in the selected portion of spectrum;
  (c) comparing the measured energy received in the selected portion of spectrum to a threshold established for the selected portion of spectrum;
  (d) when the measured energy received in the selected portion of spectrum exceeds the threshold established for the selected portion of spectrum, determining that the selected portion of spectrum is unavailable for transmission, otherwise determining that the selected portion of spectrum is available for transmission; and selecting the portion of the spectrum that is determined to be unavailable for transmission;
  (e) correlating a signal received in the selected portion of spectrum unavailable for transmission with a known feature of a signal conforming to a particular transmission format;
  (f) comparing the correlation result to a second threshold;
  (g) when the correlation result in the selected portion of spectrum exceeds the second threshold, determining that the signal received in the selected portion of spectrum conforms to the particular transmission format, otherwise determining that no signal conforming to the particular transmission format is present in the selected portion of spectrum; and
  (h) repeating (a) through (g) for each of a plurality of spectrum portions spanning the frequency band.

18. The method of claim 17, wherein the threshold established for the selected portion of spectrum is a constant multiplied by an expected input noise energy in the selected portion of spectrum in the absence of an input signal.

19. The method of claim 17, wherein the known feature of a signal conforming to the particular transmission format is one of a PN511 pseudo-random sequence and a cyclic prefix of an orthogonal frequency division multiplex signal.

20. The method of claim 17, further comprising repeating (e) through (h) for a second particular transmission format.

* * * * *